US011954841B2

(12) United States Patent
Chen et al.

(10) Patent No.: US 11,954,841 B2
(45) Date of Patent: *Apr. 9, 2024

(54) OPTICAL INSPECTION OF A WAFER

(71) Applicant: Taiwan Semiconductor Manufacturing Company, Ltd., Hsinchu (TW)

(72) Inventors: Chih-Lieh Chen, Yilan County (TW); Cheng-Kang Hu, Kaohsiung (TW); Cheng-Lung Wu, Zhunan Township (TW); Jiun-Rong Pai, Jhubei (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/805,247

(22) Filed: Jun. 3, 2022

(65) Prior Publication Data
US 2022/0292667 A1 Sep. 15, 2022

Related U.S. Application Data

(63) Continuation of application No. 16/949,765, filed on Nov. 13, 2020, now Pat. No. 11,423,526.

(51) Int. Cl.
*G06T 7/00* (2017.01)
*G01B 11/24* (2006.01)
(Continued)

(52) U.S. Cl.
CPC ............ *G06T 7/0004* (2013.01); *G01B 11/24* (2013.01); *G06T 7/73* (2017.01); *H04N 23/56* (2023.01); *G06T 2207/30148* (2013.01)

(58) Field of Classification Search
CPC ...................... G06T 7/0004; G06T 7/73; G06T 2207/30148; G01B 11/24; H04N 5/2256
See application file for complete search history.

(56) References Cited

U.S. PATENT DOCUMENTS 6,555,836 B1 * 4/2003 Takahashi ........ G01N 21/95684
250/559.22
7,924,434 B2 * 4/2011 Hwang ................... G01N 21/45
356/520

(Continued)

FOREIGN PATENT DOCUMENTS

JP 2002022415 A * 1/2002
JP 2002022415 A 1/2002

*Primary Examiner* — Richard A Hansell, Jr.
(74) *Attorney, Agent, or Firm* — Harrity & Harrity, LLP

(57) ABSTRACT

An image analysis device may align an image to determine a position of a wafer within the image. The wafer may include a plurality of wafer bumps. The image analysis device may mask, based on the position of the wafer, the image to obtain an image of a portion of the wafer. The image analysis device may binarize the image of the portion of the wafer to create a binarized image of the portion of the wafer. The image analysis device may determine a bump pattern, associated with the plurality of wafer bumps, based on the binarized image of the portion of the wafer. The image analysis device may perform a defect analysis of the determined bump pattern. The defect analysis may be associated with detecting regions of the portion of the wafer in which one or more wafer bumps have abnormal bump heights.

20 Claims, 18 Drawing Sheets

(51) Int. Cl.
*G06T 7/73* (2017.01)
*H04N 23/56* (2023.01)

(56) References Cited

U.S. PATENT DOCUMENTS

| | | | |
|---|---|---|---|
| 8,655,049 B2 * | 2/2014 | Yanai | H01L 22/20 |
| | | | 382/141 |
| 9,368,438 B2 | 6/2016 | Lin et al. | |
| 2004/0117055 A1 * | 6/2004 | Seidel | H01L 21/67288 |
| | | | 700/121 |
| 2004/0120569 A1 * | 6/2004 | Hung | G06T 7/001 |
| | | | 382/144 |
| 2005/0146714 A1 * | 7/2005 | Kitamura | G06T 7/0004 |
| | | | 356/237.2 |
| 2007/0036420 A1 * | 2/2007 | Enachescu | G06T 7/001 |
| | | | 382/141 |
| 2007/0145549 A1 * | 6/2007 | Barber | H01L 23/3157 |
| | | | 257/E23.129 |
| 2007/0197016 A1 * | 8/2007 | Fujimori | H01L 24/742 |
| | | | 257/E23.02 |
| 2008/0118369 A1 * | 5/2008 | Sando | G05D 7/0694 |
| | | | 417/36 |
| 2009/0013767 A1 * | 1/2009 | Tani | G01F 1/007 |
| | | | 356/3.13 |
| 2009/0080761 A1 * | 3/2009 | Barker | G06K 7/1404 |
| | | | 29/25.01 |
| 2011/0218762 A1 * | 9/2011 | Chen | G01B 11/24 |
| | | | 702/167 |
| 2013/0092962 A1 * | 4/2013 | Paek | H01L 33/44 |
| | | | 257/E33.012 |
| 2015/0002138 A1 * | 1/2015 | Fox | G01R 15/142 |
| | | | 324/149 |
| 2018/0374823 A1 * | 12/2018 | Son | H01L 21/486 |
| 2019/0348384 A1 * | 11/2019 | Okuzono | G06T 7/60 |
| 2020/0166334 A1 * | 5/2020 | Juk | G01B 11/2522 |
| 2020/0273158 A1 * | 8/2020 | Oota | G01B 13/065 |
| 2022/0156911 A1 | 5/2022 | Chen et al. | |

* cited by examiner

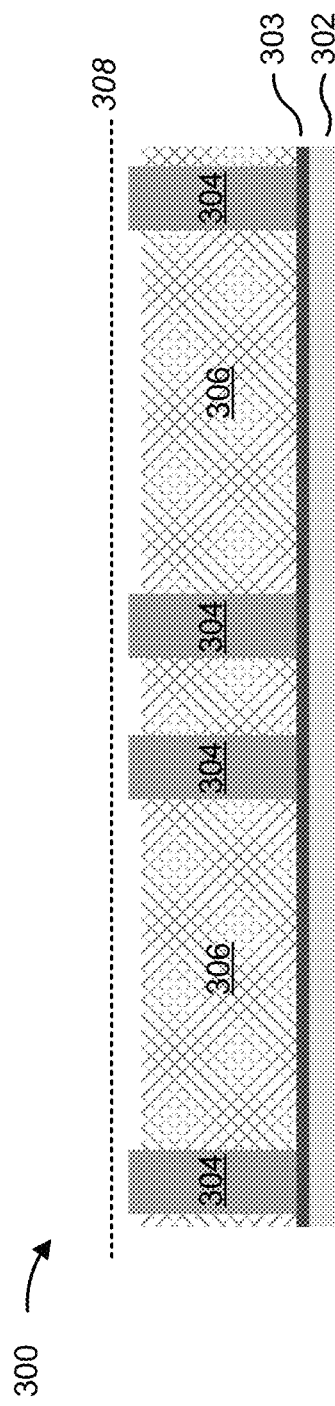
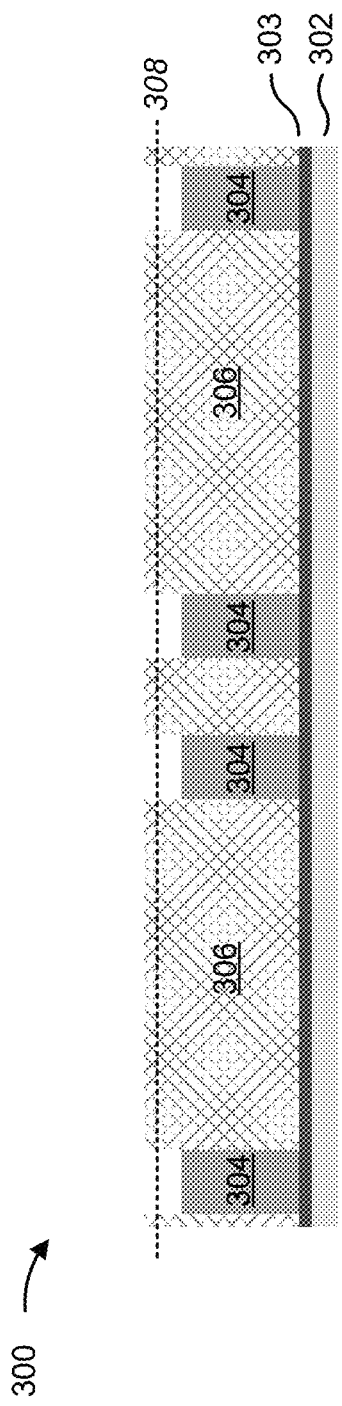
FIG. 3A
FIG. 3B

OPTICAL INSPECTION OF A WAFER

RELATED APPLICATION

This application is a continuation of U.S. patent application Ser. No. 16/949,765, filed Nov. 13, 2020, which is incorporated herein by reference in its entirety.

BACKGROUND

As the demand for smaller electronic products increases, reduction in size of integrated circuits used in electronic products is needed. In that regard, three-dimensional (3D) type integrated circuit (IC) packaging techniques have been developed and used. Through-package-vias (TPVs) are a useful component in the creation of 3D packages and 3D ICs. TPVs, such as through-InFO vias (TIVs), can be used to provide electrical connections and/or to assist in heat dissipation in a 3D IC.

One benefit of TPVs is that TPVs replace edge wiring when creating a 3D package (e.g., a System in Package, a Chip Stack Multi-chip Module, or the like). A reduction or elimination of edge wiring enable reduction in a size of the IC or package (i.e., TPVs enable miniaturization). Furthermore, TPVs enable double-side mounting of ICs.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 3A and 3B are diagrams illustrating examples of cross-sections of a wafer for which the optical inspection system described herein may detect abnormal bump heights.

DETAILED DESCRIPTION

Figure 1A:
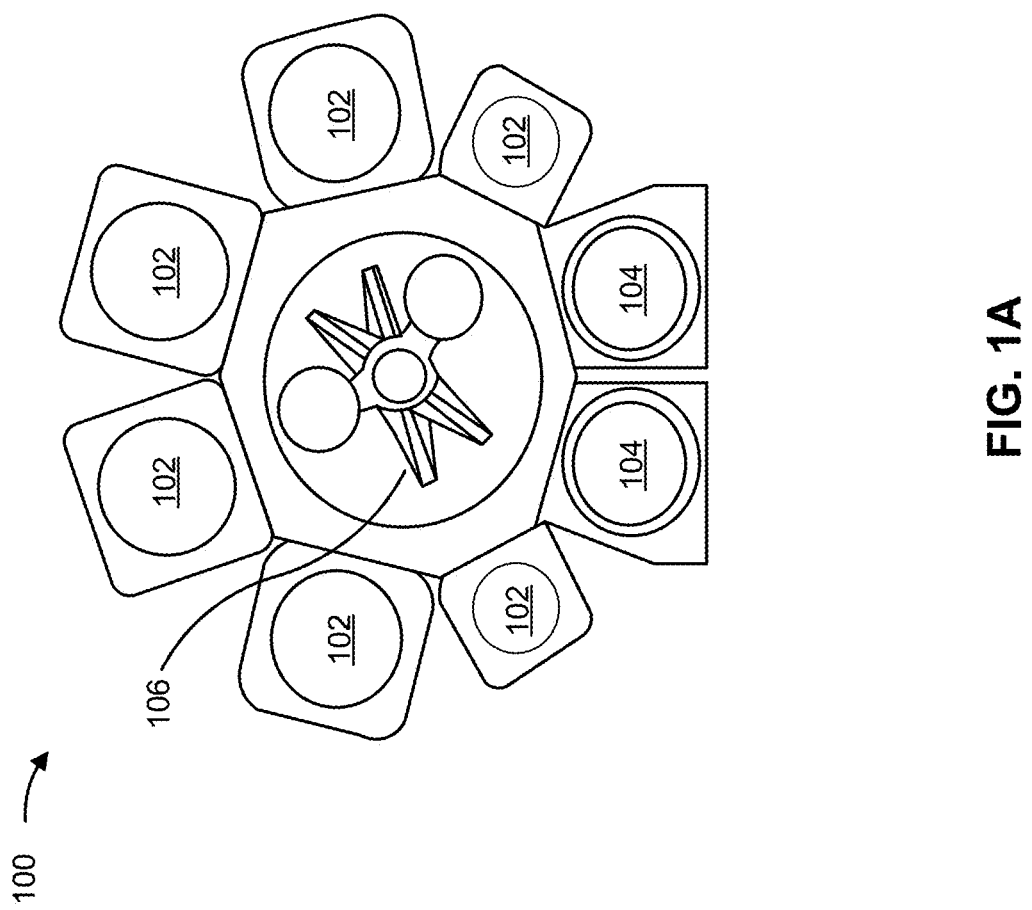
FIGS. 1A and 1B are diagrams associated with an example plating tool in which systems, devices, and/or methods described herein may be implemented.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and/or the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Bump height and coplanarity of wafer bumps of TPVs are important to ensure that reliable electrical connections are provided by the TPVs. For example, a TPV with a bump of an abnormal height (e.g., a height that is less than a desired height) may fail to provide an electrical connection. In a related process used to form TPVs, there is no mechanism for detecting abnormal bump heights immediately after a plating process is performed in association with forming metal pillars of the TPVs.

Rather, bump heights of a wafer are generally sampled after a photoresist layer associated with shaping the metal pillars is stripped, and after under bump metallurgy (UBM) etching associated with isolating the metal pillars is performed. Generally, several hours (e.g., between five and eight hours) are needed to perform the plating, the photoresist stripping, the UBM etching, and the bump height measurement for a lot of wafers being processed at a given time. As a result, any plating that results in abnormal bump heights can impact a significant number of wafers (e.g., up to 16 wafers) since a defect can be detected only by bump height measurement performed several hours after plating. That is, by the time that the plating issue can be detected, a significant number of wafers may be affected, thereby reducing yield and increasing a glass recycle rate. Furthermore, even when bump height measurement is performed in the manner described above, a relatively low sampling rate (e.g., 17%) is typically used. That is, a relatively low percentage of bump heights on a given wafer are actually measured. As a result, some TPVs having abnormal bump heights may go undetected at this processing step, meaning that performance and/or yield can be further reduced.

Some implementations described herein provide techniques and apparatuses for in-situ automated optical inspection of wafer bump heights. In some implementations, an in-situ automated optical inspection system (herein referred to as an optical inspection system) is included in a plating tool, and is configured to detect abnormal bump heights of TPVs immediately after plating. That is, the optical inspection system is configured to detect abnormal bump heights in TPVs prior to photoresist stripping, UBM etching, and bump height measurement.

In some implementations, the optical inspection system is implemented on a wafer transfer path between a processing chamber of the plating tool and a load chamber of the plating tool. This positioning on the wafer transfer path allows the optical inspection system to capture an image of the wafer after plating is performed on the wafer and while the wafer is being transferred from a final processing chamber of the plating tool to a load chamber of the plating tool. In some implementations, the optical inspection system analyzes the image to identify regions on the wafer with abnormal bump heights. For example, the optical inspection system may use a low bump algorithm to detect regions having abnormal bump heights when the bumps are not to extend above the photoresist layer, and may use a high bump algorithm to detect regions having abnormal bump heights when the bumps are to extend above the photoresist layer by a particular amount.

The optical inspection system described herein improves detection of TPVs having abnormal bump heights by enabling bump heights across an entire wafer to be evaluated immediately after plating. By enabling detection of abnormal bump heights immediately after plating, a glass recycle rate is improved. Commonly, if a plating process results in a wafer having abnormal bump heights, then the wafer is provided to glass recycling for rework. However, when the optical inspection system described herein is implemented in the plating tool, a number of wafers impacted by abnormal plating is reduced. For example, when a plating tool can process two wafers at a given time, the number of impacted wafers is reduced from 16 pieces (e.g., since multiple sets of wafers could be impacted before the abnormal plating is detected) to four pieces (e.g., since abnormal plating detected by the optical inspection system would impact only the current two wafers and potentially a next two wafers). Here, fewer wafers are impacted by the time the abnormal plating is detected, thereby improving the glass recycle rate (e.g., from approximately 1.66% to approximately 0.4%).

Further, by improving a sampling rate of evaluated bump heights to 100% (e.g., as compared to a relatively low percentage, such as 17%, when performing only a bump height measurement process), TPVs having abnormal bump heights are more likely to be detected. As a result, yield associated with manufacture of a device including TPVs is increased. For example, a rate of abnormality in manufacture of a device including TPVs may improve from approximately 50 parts per million to approximately 10 parts per million. Further, the improved detection of abnormal bump heights results in performance improvement by preventing wafers with abnormal bump heights from going undetected.

Figure 1B:
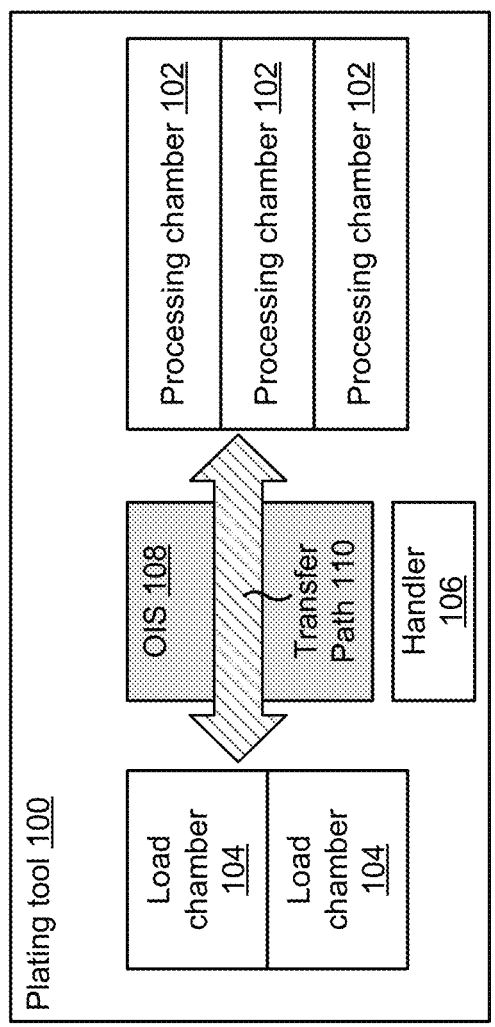

FIGS. 1A and 1B are diagrams associated with an example plating tool 100 in which systems, devices, and/or methods described herein may be implemented. The plating tool 100 includes one or more devices capable of plating a substrate (e.g., a wafer, a semiconductor device, and/or the like) or a portion thereof with one or more metals. For example, the plating tool 100 may include a copper electroplating device, an aluminum electroplating device, a nickel electroplating device, a tin electroplating device, a compound material or alloy (e.g., tin-silver, tin-lead, and/or the like) electroplating device, and/or an electroplating device for one or more other types of conductive materials, metals, and/or the like. Plating, and particularly electroplating (or electro-chemical deposition), is a process by which conductive structures are formed on a substrate (e.g., a semiconductor wafer, a semiconductor device, and/or the like). Plating may include applying a voltage across an anode formed of a plating material and a cathode (e.g., a substrate). The voltage causes a current to oxidize the anode, which causes the release of plating material ions from the anode. These plating material ions form a plating solution that travels through a plating bath toward the substrate. The plating solution reaches the substrate and deposits plating material ions into trenches, vias, interconnects, and/or other structures in and/or on the substrate.

As shown in FIG. 1A, the plating tool 100 may include one or more processing chambers 102, one or more load chambers 104, and a handler device 106. A processing chamber 102 includes a chamber in which a processing technique associated with plating a wafer can be performed. For example, a processing chamber 102 may include one or more plating baths filled with a plating solution, which is a liquid containing a plating material and one or more additives. The plating material can, for example, include various types of conductive materials, metals, and/or the like. For example, the plating material and the anode may include copper, aluminum, nickel, tin, tin-lead, tin-silver, and/or another type of material. The additives may include various types of levelers, brighteners or accelerators, inhibitors, suppressors, enhancers, and/or other types of organic and/or inorganic additives that may be used to increase or decrease deposition rates of the plating material on the wafer, reduce surface roughness of the plating material deposited onto the wafer, and/or the like. In some implementations, the plating tool 100 may include a plurality of processing chambers 102 (e.g., where each processing chamber 102 may be configured to plate the wafer with a same or different plating material). In some implementations, the one or more processing chambers 102 may include one or more other types of processing chambers associated with performing the plating process.

A load chamber 104 includes a chamber in which a wafer is loaded before and/or after a processing technique associated with plating the wafer is performed in one or more processing chambers 102. For example, a wafer can be loaded into the load chamber 104, after which handler device 106 can transfer, carry, or otherwise move the wafer among one or more processing chambers 102 in association with performing the plating process on the wafer. After the plating of the wafer is completed, the handler device 106 may transfer, carry, or otherwise move the wafer to the load chamber 104 to allow the wafer to be unloaded from the plating tool.

Handler device 106 includes a device associated with transferring, carrying, or otherwise moving a wafer to and/or between one or more of the aforementioned processing chambers 102 and/or load chambers 104. For example, handler device 106 may include a robotic arm, a group of robotic arms, and/or the like.

Notably, the arrangements of the processing chambers 102 and load chambers 104 in the plating tool 100 shown in FIG. 1A are for explanatory purposes. One or more of the processing chambers 102 in the plating tool 100 may be differently arranged, one or more of the processing chambers 102 may be spaced apart from other processing chambers 102 (e.g., processing chambers 102 may be spaced apart and the handler device 106 may be a robot that transports a wafer to and/or from the spaced-apart processing chambers 102), and/or the like. Moreover, the processing chambers 102 and load chambers 104 of the plating tool 100 may be used in conjunction with other semiconductor processing tools and/or chambers to further prepare and/or process a semiconductor device.

As illustrated in the block diagram of FIG. 1B, the plating tool 100 further includes an optical inspection system (OIS) 108. As shown in FIG. 1B, the optical inspection system 108 may be arranged on a transfer path 110 of the plating tool 100. The transfer path 110 is a path between one or more processing chambers 102 of the plating tool 100 and one or more load chambers 104 of the plating tool 100. That is, the transfer path 110 is a path along which the handler device 106 transfers, carries, or moves a wafer to a load chamber 104 after the plating process is performed in one or more of the processing chambers 102.

The optical inspection system 108 is a system configured to detect abnormal bump heights of TPVs immediately after plating is performed by the plating tool 100 (e.g., before photoresist stripping, UBM etching, or bump height measurement are performed). In some implementations, the positioning of the optical inspection system 108 on the transfer path 110 allows the optical inspection system 108 to capture an image of the wafer after plating is performed while the wafer is being transferred from a final processing chamber 102 of the plating tool 100 to a load chamber 104 of the plating tool 100. In some implementations, the optical inspection system 108 analyzes the image to identify regions on the wafer with abnormal bump heights, as described in further detail below.

As indicated above, FIGS. 1A and 1B are provided merely examples. Other examples may differ from what is described with regard to FIGS. 1A and 1B.

Figure 2:
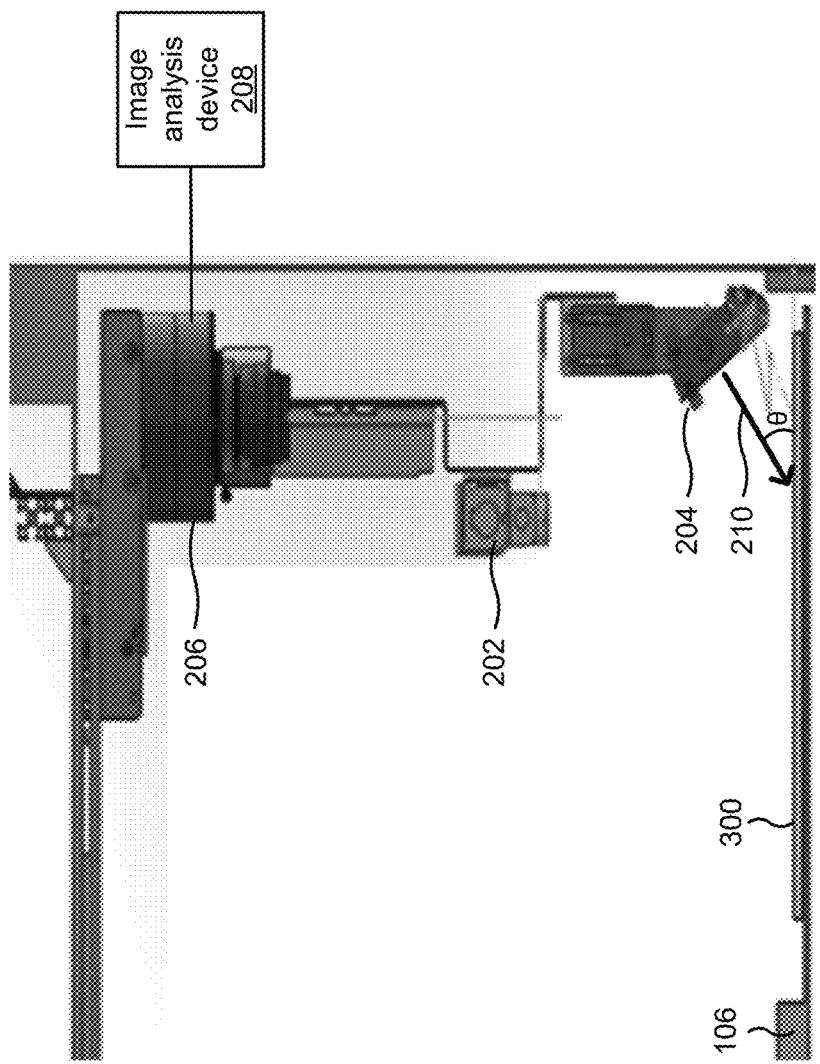
FIG. 2 is a diagram illustrating an example of an optical inspection system in accordance with various aspects of the present disclosure.

FIG. 2 is a diagram illustrating an example of the optical inspection system 108 in accordance with various aspects of the present disclosure. As shown in FIG. 2, the optical inspection system 108 includes a photoelectric sensor 202, a light source 204, a camera 206, and an image analysis device 208.

The photoelectric sensor 202 includes a device to detect a wafer 300 on the transfer path 110 of the plating tool 100 and trigger operation of the light source 204 and the camera 206 based on the detection of the wafer 300 on the transfer path 110. For example, in some implementations, the photoelectric sensor 202 may include a photo interrupter. A photo interrupter is a transmission-type photosensor that includes a light emitting component and a light receiving component, where the light receiving component is positioned to receive light emitted by the light emitting component. In optical inspection system 108, the light emitting component and the light receiving component are on opposite sides of a point of the transfer path 110 such that light emitted by the light emitting component is blocked from being received (i.e., interrupted) when the wafer 300 is passing through a particular point on the transfer path 110. Conversely, when there is no wafer passing through the particular point on the transfer path 110, the light emitted by the light emitting component is received by the light receiving component. Thus, when the light receiving component is not receiving the light emitted by the light emitting component, the photoelectric sensor 202 detects the wafer 300 on the transfer path 110. In some implementations, based on detecting the wafer 300 on the transfer path 110, the photoelectric sensor 202 may trigger operation of the light source 204. For example, upon detecting the wafer 300 on the transfer path 110, the photoelectric sensor 202 may send an electrical signal to the light source 204 that causes the light source 204 to emit light. In some implementations, based on detecting the wafer 300 on the transfer path 110, the photoelectric sensor 202 may trigger operation of the camera 206. For example, upon detecting the wafer 300 on the transfer path 110, the photoelectric sensor 202 may send an electrical signal to the camera 206 that causes the camera 206 to begin generating an image of the wafer 300.

The light source 204 is a device to emit light 210 to illuminate the wafer 300 on the transfer path 110 of the plating tool 100. In some implementations, the light source 204 is arranged to illuminate a surface of the wafer 300 on the transfer path 110. For example, the light source 204 may be arranged to illuminate an area including the particular point on the transfer path 110 at which the photoelectric sensor 202 is arranged. In some implementations, the light source 204 illuminates the wafer 300 based on being triggered by the photoelectric sensor 202 (e.g., based on a receiving a trigger signal from the photoelectric sensor 202).

In some implementations, as shown in FIG. 2, the light source 204 may be arranged such that the light 210 emitted by the light source 204 is incident at a particular angle θ with respect to the surface of the wafer 300. In some implementations, the angle θ is less than or equal to approximately 30 degrees)(°. In some implementations, the angle θ is selected to cause regions of the wafer 300 with bump heights to be illuminated in an image generated by the optical inspection system 108.

The camera 206 is a device to generate an image of the wafer 300 on the transfer path 110. In some implementations, the camera 206 is a line scan camera. In such a case, the camera 206 may include a one-dimensional array of pixels, and may generate a two-dimensional image of the wafer 300 as a result of the movement of the wafer 300 along the transfer path 110. That is, the camera 206 may generate the image of the wafer 300 line-by-line as the wafer 300 moves along the transfer path 110. Notably, the wafer 300 is illuminated by the light 210 emitted by the light source 204 within the image generated by the camera 206. In some implementations, the camera 206 generates the image of the wafer 300 based on being triggered by the photoelectric sensor 202 (e.g., based on a receiving a trigger signal from the photoelectric sensor 202).

The image analysis device 208 is a device to detect abnormal bump heights of the wafer 300 based on the image generated by the camera 206. In some implementations, the image analysis device 208 may perform a defect analysis associated with detecting regions of the wafer 300 in which one or more bumps have abnormal bump heights. In some implementations, the defect analysis is performed based on the image of the wafer 300 that is generated by the camera 206 (e.g., the image in which the wafer 300 is illuminated by the light source 204). In some implementations, the image analysis device 208 may process the image in association with performing the defect analysis. The processing of the image may include, for example, aligning the image, masking the image, binarizing the image, determining a bump pattern associated with the image, and/or the like. Additional details regarding operation of the image analysis device 208 are provided below.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

FIGS. 3A and 3B are diagrams illustrating examples of cross-sections of a wafer for which the optical inspection system described herein may detect abnormal bump heights.

As noted above with respect to FIG. 2, in some implementations, the image analysis device 208 may be a device to detect abnormal bump heights of the wafer 300 based on the image generated by the camera 206. For example, in some implementations, the image analysis device 208 may process the image generated by the camera 206, and may perform a defect analysis after processing the image.

In some implementations, the image analysis device 208 may process the image and perform the defect analysis after a plating process is performed on the wafer 300 and prior to a photoresist stripping process being performed on the wafer 300. With reference to FIGS. 3A and 3B, metal pillars 304 (e.g., to form one or more TPVs of the wafer 300) are formed during the plating process (e.g., in a processing chamber 102 of the plating tool 100). As shown, the metal pillars 304 (also referred to herein as wafer bumps 304) may be formed on a UBM layer 303, and are shaped according to dimensions of openings in a photoresist layer 306. Ideally, the metal pillars 304 formed by the plating process have a desired height 308. However, in some cases, the metal pillars 304 formed by the plating process have abnormal heights. For example, as shown in FIG. 3A, metal pillars 304 may be designed to extend to a desired bump height 308 above the photoresist layer 306, but one or more metal pillars 304 may have abnormal heights. As a particular example, one or more metal pillars 304 may not extend to the desired bump height 308, as shown in FIG. 3A, and/or one or more metal pillars 304 may extend past the desired bump height 308. As another example, as shown in FIG. 3B, metal pillars 304 may be designed to extend to a desired bump height 308 below the photoresist layer 306, but one or more metal pillars 304 may have abnormal heights. As a particular example, one or more metal pillars 304 may not extend to the desired bump height 308, as shown in FIG. 3B, and/or one or more metal pillars 304 may extend past the desired bump height 308.

A next step associated with processing the wafer 300 is to strip the photoresist layer 306 from the wafer 300. Therefore, the handler device 106 of the plating tool 100 may be configured to transfer, carry, or move the wafer 300 from the final processing chamber 102 of the plating tool 100 to a load chamber 104 of the plating tool 100 (e.g., such that the wafer 300 can be transported to a tool configured to perform photoresist stripping). Generally, a UBM etching process is to be performed after the photoresist stripping. UBM etching may include etching of the UBM layer 303 to isolate the metal pillars 304, where the metals pillars 304 serve as an etching mask. After the UBM etching, bump height measurement is performed (e.g., using a 3D measurement technology, such as confocal chromatic sensor, and/or the like).

In some implementations, the image analysis device 208 performs the defect analysis prior to the photoresist layer 306 being stripped from the wafer 300 (and therefore prior to UBM etching or bump height measurement being performed). For example, as described above, the optical inspection system 108 may be arranged on the transfer path 110 between the final processing chamber 102 of the plating tool 100 and the load chamber 104 of the plating tool 100. Thus, the optical inspection system 108 can obtain an image of the wafer 300 on the transfer path 110 and (e.g., using the image analysis device 208) can perform the defect analysis prior to the photoresist layer 306 being stripped from the wafer 300.

FIGS. 3A and 3B are provided as examples, and other examples may differ from what is described with regard to FIGS. 3A and 3B.

FIGS. 4A-4F illustrate an example of detecting a region of a wafer 300 with bumps that are to extend above the photoresist layer 306 of the wafer 300.

In some implementations, the image analysis device 208 performs defect analysis on the image of the wafer 300. The defect analysis may include detecting regions of the wafer 300 in which one or more bumps are to extend above a surface of a photoresist layer by a threshold amount. For example, in one application, a desired bump height may be 255 microns ($\mu$m), while a height of the photoresist layer 306 is 230 $\mu$m. In such a case, the defect analysis may include detecting regions of the wafer 300 in which one or more bumps do not extend to 255 $\mu$m (e.g., 25 $\mu$m above the photoresist layer 306).

Figure 4A:
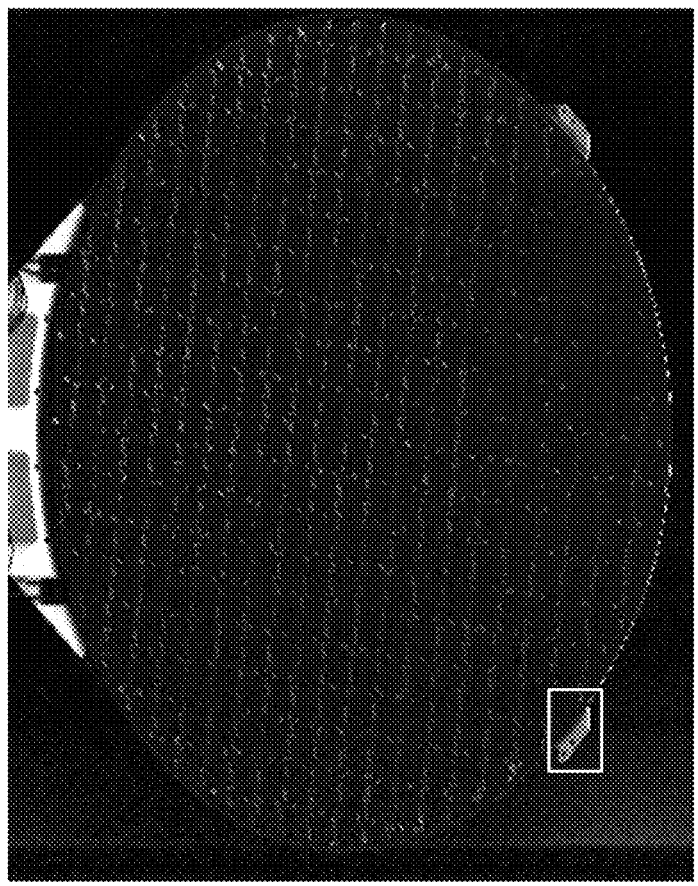
FIGS. 4A-4F illustrate an example of detecting a region of a wafer with bumps that are to extend above a photoresist layer of a wafer by a particular amount.

In a first step, as shown in FIG. 4A, the image analysis device 208 may align the image to determine a position of the wafer 300 within the image. For example, as indicated in FIG. 4A, the image analysis device 208 may align a pattern on a gripper of the handler device 106 (indicated by the rectangle in FIG. 4A), and may determine a position of the wafer 300 within the image according to the alignment of the pattern.

Figure 4B:
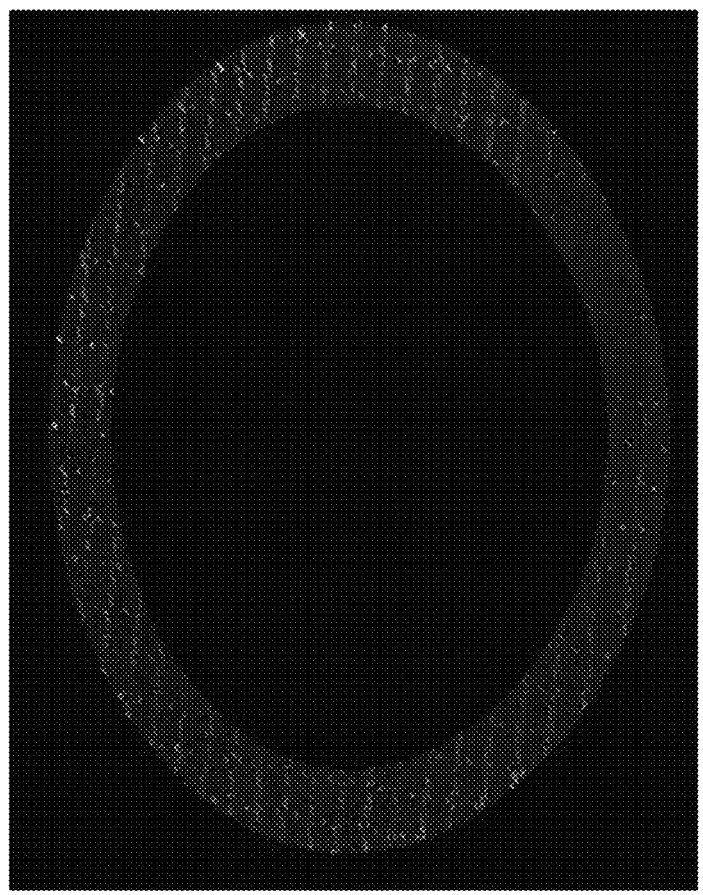

In a second step, as shown in FIG. 4B, the image analysis device 208 may mask the image based on the position of the wafer 300 within the image. Here, a result of masking the image is an image of a portion of the wafer 300. For example, as shown in FIG. 4B, the image analysis device 208 may, based on the position of the wafer 300 determined by aligning the image, mask the image to obtain an image of a portion of the wafer. In some implementations, as shown in FIG. 4B, the image analysis device 208 may be configured to mask the image to obtain an image including only a portion of (e.g., an outer ring of) the wafer 300. In some implementations, masking the image to obtain an image including an outer ring portion of the wafer 300 is desirable because defects are most likely present nearer to an edge of the wafer 300 as a bad uniformity of plating, and analyzing only a portion of the image will increase speed of the defect analysis, as well as conserve processing resources, memory resources, and/or the like. In some implementations, a radius at which the image analysis device 208 masks the image may be configurable (e.g., by a user of the optical inspection system 108). Notably, if the radius at which the image analysis device 208 masks the image is set to zero, then the portion of the image resulting from the masking includes an image of the entire wafer 300.

Figure 4C:
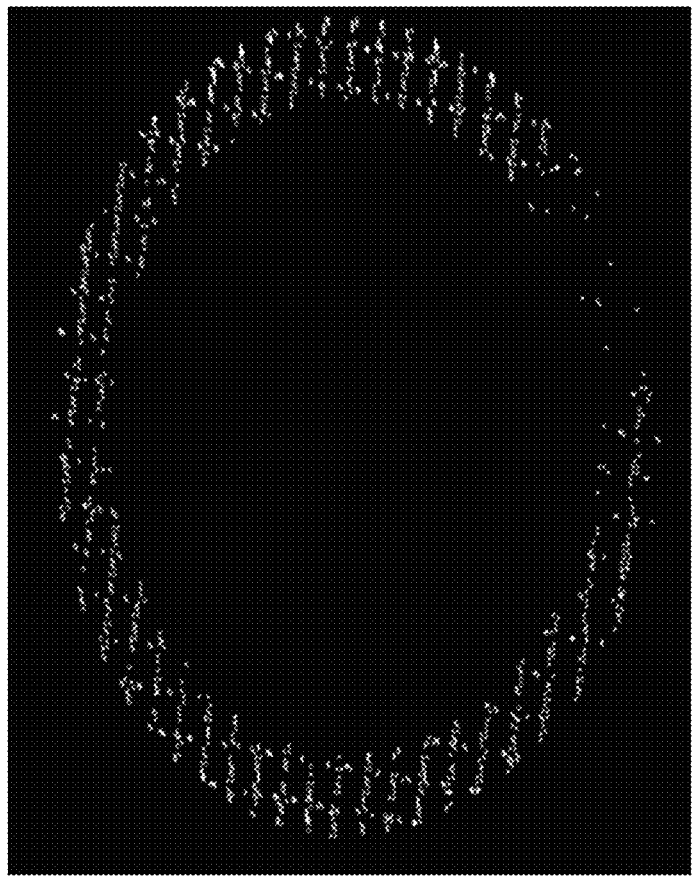

In a third step, as shown in FIG. 4C, the image analysis device 208 may binarize the image of the portion of the wafer 300, where a result of binarizing the image of the portion of the wafer 300 is a binarized image of the portion of the wafer 300. For example, the light 210 is emitted by the light source 204 such that the light 210 illuminates the wafer 300. As a result, top surfaces and/or side surfaces of the wafer bumps (i.e., the metal pillars 304) on the wafer 300 can be illuminated, where a brightness or intensity of illumination of a given wafer bump is dependent on the bump height (e.g., a brightness or intensity of illumination of a wafer bump with a lower bump height is less than that of wafer bump with a higher bump height). This brightness or intensity is translated to a gray value within the image of the portion of the wafer and, therefore, meaning that wafer bumps may have various gray values within the image (depending on bump heights of the wafer bumps). Here, the image analysis device 208 may be configured with a gray value threshold. The gray value threshold can be selected so that a point with gray value that satisfies (e.g., is greater than or equal to) the gray value threshold is indicative of a wafer bump that has a desired height, while a point with a gray value that does not satisfy (e.g., is less than) the gray value threshold is indicative of a wafer bump that has an abnormal height. Here, each point of the image of the portion of the wafer having a gray value that satisfies the gray value threshold may be given a value of 1, while each point of the image of the portion of the wafer having a gray value that does not satisfy the gray value threshold may be given a value of 0. The binarized image of the portion of the wafer is generated based on these values. For example, as shown in FIG. 4C, points given a value of 1 are displayed in a bright color (e.g., white), while points given a value of 0 are displayed in a dark color (e.g., black).

Figure 4D:
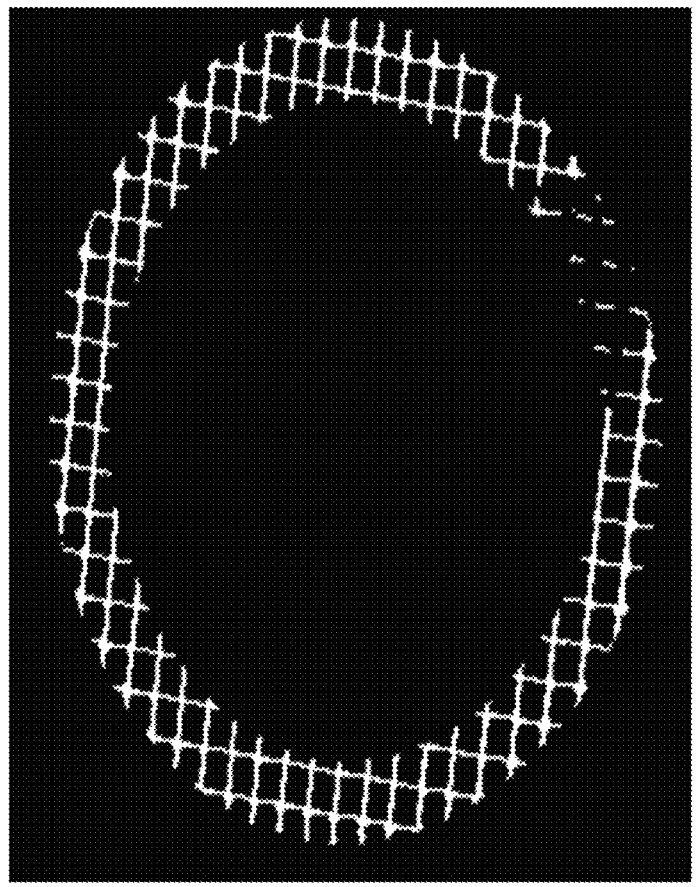

In a fourth step, as shown in FIG. 4D, the image analysis device 208 may determine a bump pattern based on the binarized image of the portion of the wafer 300. For example, in the case of detecting abnormal bump heights for bumps that are to extend above the photoresist layer 306 by a particular amount, the image analysis device 208 may determine the bump pattern by connecting points in the binarized image that are separated by a distance that satisfies (e.g., is less than or equal to) a threshold distance. That is, for a given bright point in the binarized image, the image analysis device 208 may identify a set of bright points within a threshold distance of the given bright point. The image analysis device 208 may then connect the given bright point to each of the set of bright points that are within the threshold distance.

Figure 4E:
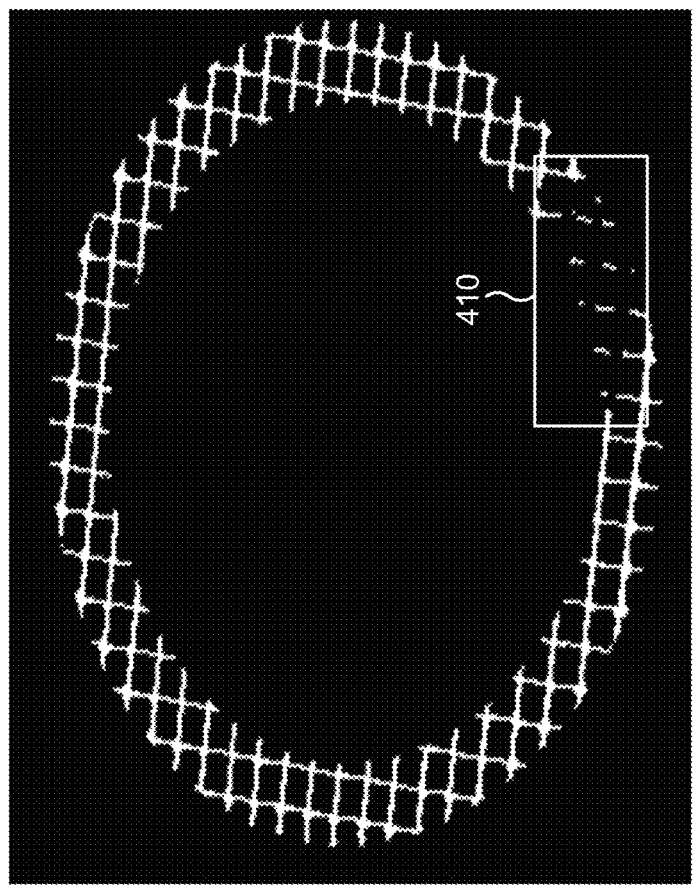
Figure 4F:
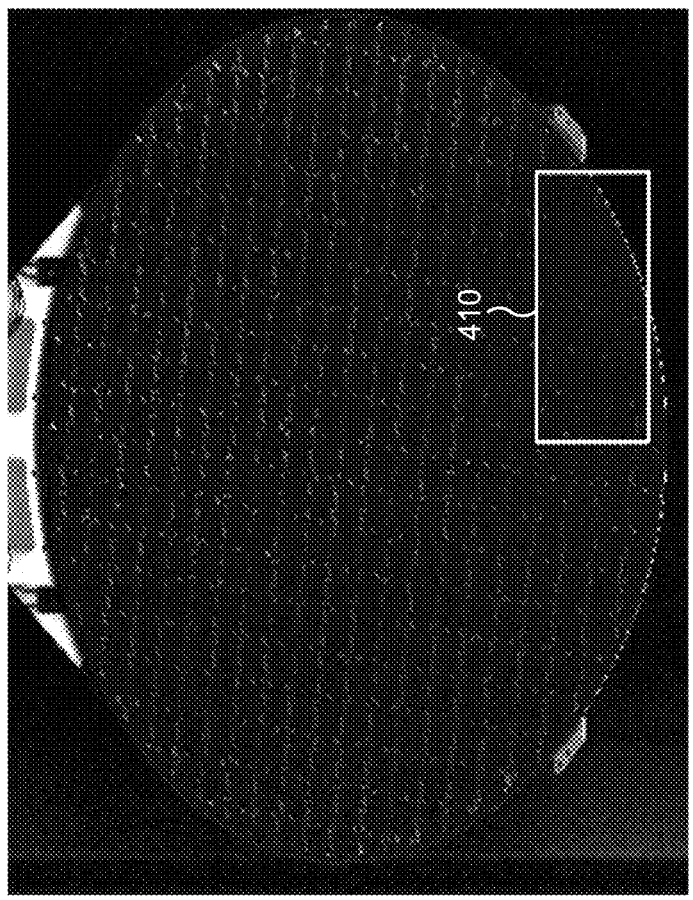

In a fifth step, as shown in FIG. 4E, the image analysis device 208 may perform a defect analysis of the determined bump pattern. For example, the image analysis device 208 may identify an open region based on the bump pattern and the image of the portion of the wafer 300. Here, the open region is a region of the portion of the wafer 300 in which the bump pattern is not present (or is just partially present). Next, the image analysis device 208 may calculate an area of the open region, and may determine whether the area of the open region satisfies an open area threshold. Here, if the area of the open region satisfies (e.g., is greater than or equal to) the open area threshold, then the image analysis device 208 may identify the open region as region of the wafer 300 having abnormal bump heights. In some implementations, the open area threshold is a percentage of an area of the wafer 300, such as approximately 10% of an area of the wafer 300. In the example shown in FIG. 4E, the image analysis device 208 identifies a region 410 as a region having abnormal bump heights. FIG. 4F illustrates the region 410 overlaid on the original image obtained by the optical inspection system 108.

In some implementations, when the image analysis device 208 detects a region of the wafer 300 with abnormal bump heights, the optical inspection system 108 (e.g., the image analysis device 208) may send (e.g., to a controller of the plating tool 100) a warning signal indicating that the image analysis device 208 has detected a plating issue. In some implementations, the warning signal may cause the plating tool 100 to cease performing the plating process (e.g., such that the abnormal bump height issue can be resolved), thereby preventing additional wafers 300 from being impacted.

As indicated above, FIGS. 4A-4F are provided as examples. Other examples may differ from what is described with regard to FIGS. 4A-4F.

FIGS. 5A-5F illustrate an example of detecting a region of a wafer 300 with bumps that are not to extend above the photoresist layer 306 of the wafer 300.

In some implementations, the image analysis device 208 performs defect analysis on the image of the wafer 300. The defect analysis may include detecting regions of the wafer 300 in which one or more bumps are not to extend above a surface of a photoresist layer. For example, in one application, a desired bump height may be 223 μm, while a height of the photoresist layer 306 is 230 μm. In such a case, the defect analysis may include detecting regions of the wafer 300 in which one or more bumps do not extend to 223 μm (e.g., 7 μm below the photoresist layer 306).

Figure 5A:
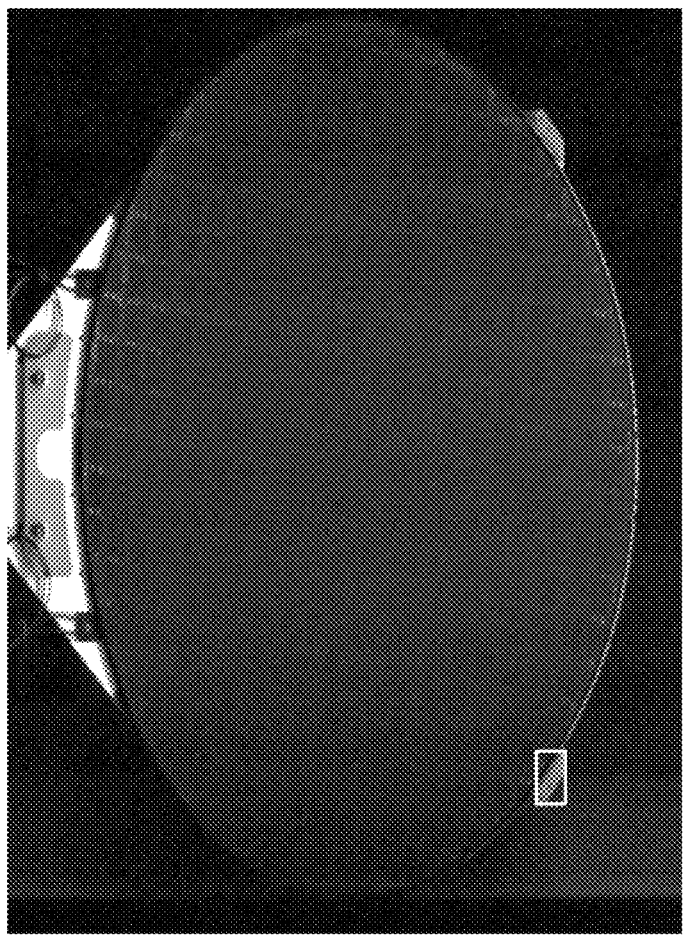
FIGS. 5A-5F illustrate an example of detecting a region of a wafer with bumps that are not to extend above a photoresist layer of a wafer.

In a first step, as shown in FIG. 5A, the image analysis device 208 may align the image to determine a position of the wafer 300 within the image. For example, as indicated in FIG. 5A, the image analysis device 208 may align a pattern on a gripper of the handler device 106 (indicated by the rectangle in FIG. 5A), and may determine a position of the wafer 300 within the image according to the alignment of the pattern.

Figure 5B:
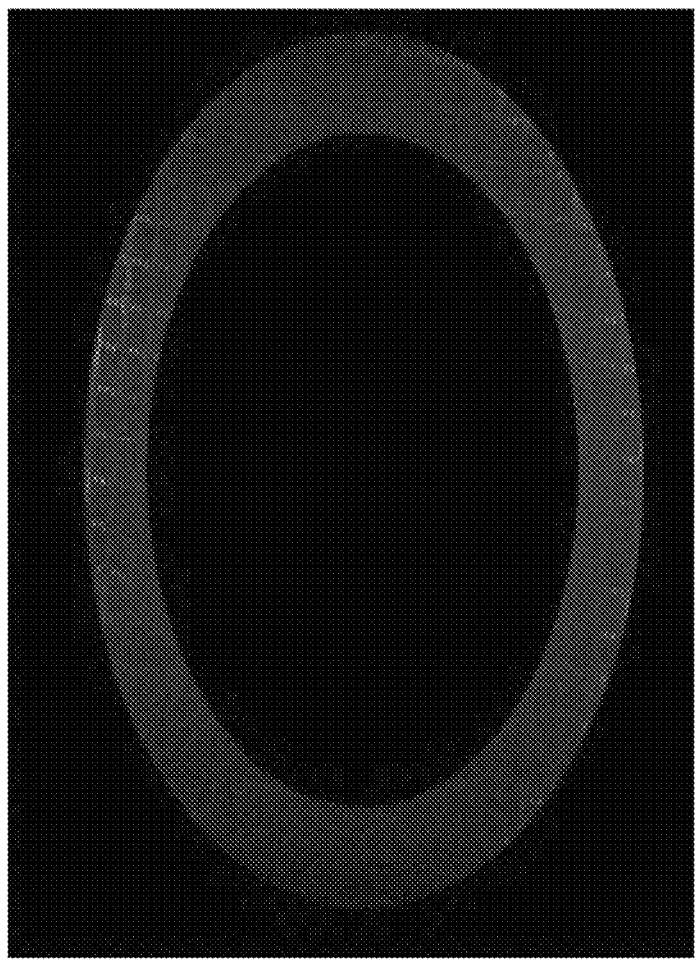

In a second step, as shown in FIG. 5B, the image analysis device 208 may mask the image based on the position of the wafer 300 within the image. Here, a result of masking the image is an image of a portion of the wafer 300. For example, as shown in FIG. 5B, the image analysis device 208 may, based on the position of the wafer 300 determined by aligning the image, mask the image to obtain an image of a portion of the wafer. In some implementations, as shown in FIG. 5B, the image analysis device 208 may be configured to mask the image to obtain an image including only a portion of (e.g., an outer ring of) the wafer 300, as described above in association with FIG. 4B.

Figure 5C:
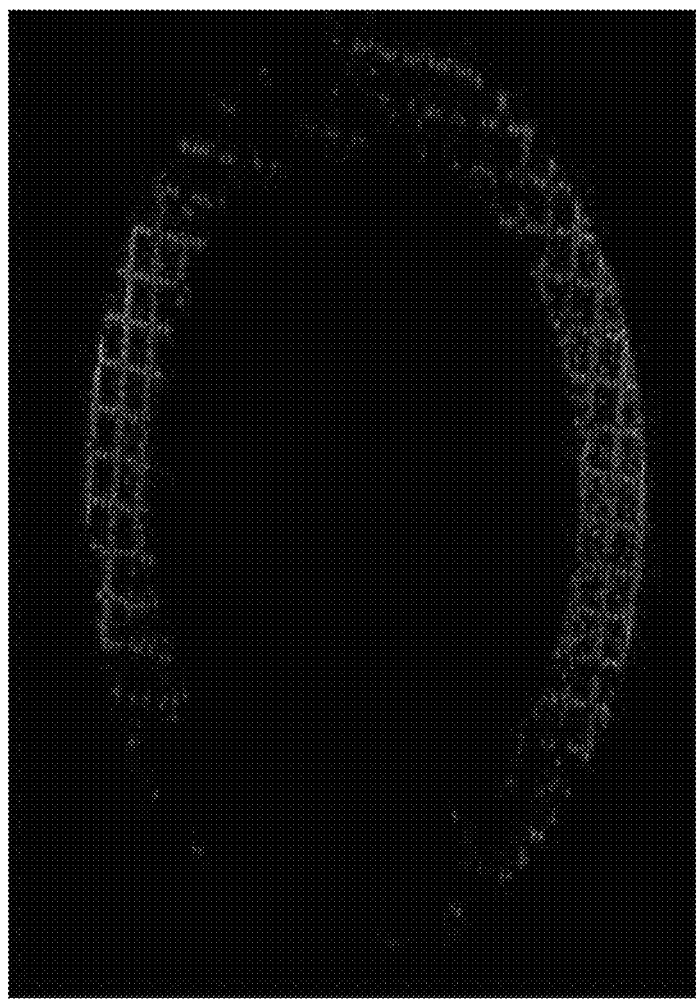

In a third step, as shown in FIG. 5C, the image analysis device 208 may binarize the image of the portion of the wafer 300, where a result of binarizing the image of the portion of the wafer 300 is a binarized image of the portion of the wafer 300. In some implementations, the image analysis device 208 may create the binarized image in a manner similar to that described above in association with FIG. 4C.

Figure 5D:
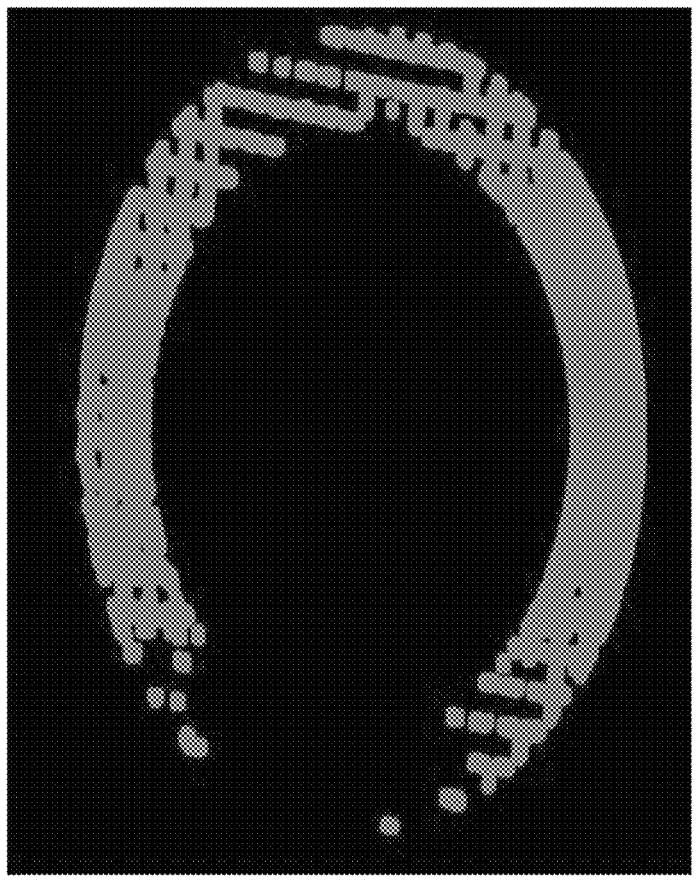

In a fourth step, as shown in FIG. 5D, the image analysis device 208 may determine a bump pattern based on the binarized image of the portion of the wafer 300. For example, in the case of detecting abnormal bump heights for bumps that are not to extend above the photoresist layer 306, the image analysis device 208 may determine the bump pattern by closing, filtering, and dilating points in the binarized image. Notably, the brightness and size of bumps that are not to extend above the photoresist layer 306 are lower and smaller within the image (e.g., as compared to the image when the bumps are to extend above the photoresist layer 306). Thus, to determine the bump pattern, the image analysis device 208 may close the bright points together, filter noise, and dilate the points to determine the bump pattern.

Figure 5E:
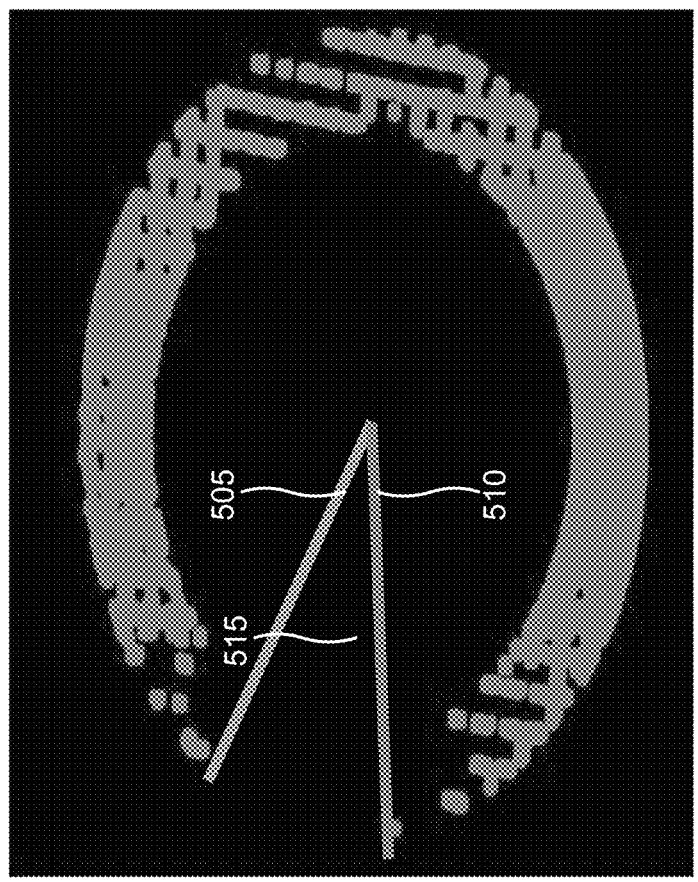

In a fifth step, as shown in FIG. 5E, the image analysis device 208 may perform a defect analysis of the determined bump pattern. For example, the image analysis device 208 may identify an open angular section based on the determined bump pattern. Here, the open angular section is an angular section of the portion of the wafer 300 in which the bump pattern is not present. To identify an open angular section, the image analysis device 208 may create a line from a center of the wafer 300 to an edge of the wafer 300 at a particular angle within the image (e.g., 0 degrees). Next, the image analysis device 208 may determine whether the line intersects a bright region. If so, the image analysis device 208 may create another line from the center of the wafer 300 to the edge of the wafer 300 at a next configured interval (e.g., +0.1 degrees) relative to the previous angle, and may again determine whether the line intersects a bright region. The image analysis device 208 may repeat these steps until creating a line that does not intersect a bright region. Such a line is identified as line 505 in FIG. 5E. After creating the line that does not intersect a bright region, the image analysis device 208 may then create another line from the center of the wafer 300 to the edge of the wafer 300 at the next configured interval. Next, the image analysis device 208 may determine whether this line intersects a bright region. If not, the image analysis device 208 creates another line from the center of the wafer 300 to the edge of the wafer 300 at a next configured interval relative to the previous angle, and determines whether the line intersects a bright region. The image analysis device 208 may repeat these steps until creating a line that intersects a bright region. Such a line is identified as line 510 in FIG. 5E. Next, the image analysis device 208 may calculate an angle associated with the open angular section by determining angular difference between the line 505 and the line 510. This angle is identified as angle 515 in FIG. 5E.

Figure 5F:
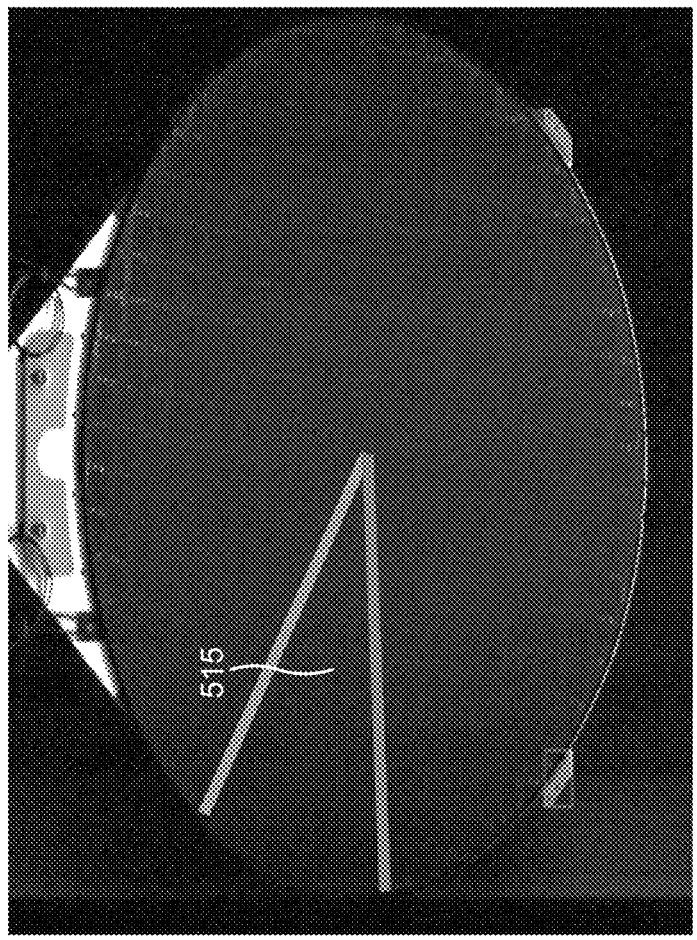

The image analysis device 208 may then determine whether the angle associated with the open angular section satisfies an open angle threshold. Here, if the angle associated with the open angular section satisfies (e.g., is greater than or equal to) the open angle threshold, then the image analysis device 208 may identify the open angular section as region of the wafer 300 having abnormal bump heights. In some implementations, the open angle threshold is in a range from approximately 10 degrees to approximately 20 degrees, such as 15 degrees. In the example shown in FIG. 5E, the image analysis device 208 identifies the angle 515 as an open angle having abnormal bump heights. FIG. 5F illustrates the angle 515 overlaid on the original image obtained by the optical inspection system 108.

In some implementations, when the image analysis device 208 detects a region of the wafer 300 with abnormal bump heights, the optical inspection system 108 (e.g., the image analysis device 208) may send (e.g., to a controller of the plating tool 100) a warning signal indicating that the image analysis device 208 has detected a plating issue. In some implementations, the warning signal may cause the plating tool 100 to cease performing the plating process (e.g., such that the abnormal bump height issue can be resolved), thereby preventing additional wafers 300 from being impacted.

As indicated above, FIGS. 5A-5F are provided as examples. Other examples may differ from what is described with regard to FIGS. 5A-5F.

Figure 6:
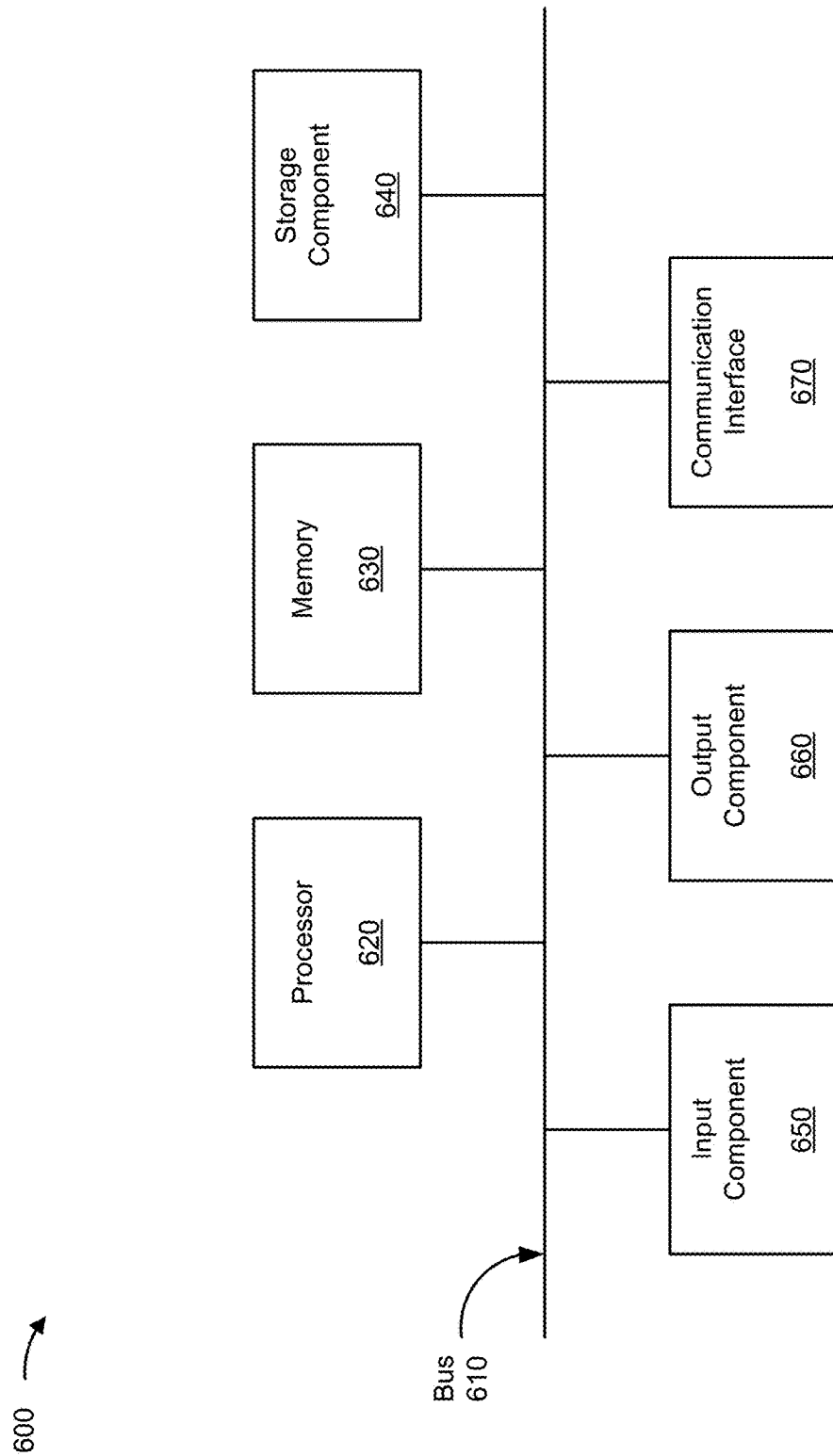
FIG. 6 is a diagram of example components of one or more devices of an optical inspection system in accordance with various aspects of the present disclosure.

FIG. 6 is a diagram of example components of a device 600, which may correspond to one or more components of the optical inspection system 108 (e.g., the photoelectric sensor 202, the light source 204, the camera 206, and/or the image analysis device 208). In some implementations, the one or more components of the optical inspection system 108 may include one or more devices 600 and/or one or more components of device 600. As shown in FIG. 6, device 600 may include a bus 610, a processor 620, a memory 630, a storage component 640, an input component 650, an output component 660, and a communication component 670.

Bus 610 includes a component that enables wired and/or wireless communication among the components of device 600. Processor 620 includes a central processing unit, a graphics processing unit, a microprocessor, a controller, a microcontroller, a digital signal processor, a field-programmable gate array, an application-specific integrated circuit, and/or another type of processing component. Processor 620 is implemented in hardware, firmware, or a combination of hardware and software. In some implementations, processor 620 includes one or more processors capable of being programmed to perform a function. Memory 630 includes a random access memory, a read only memory, and/or another type of memory (e.g., a flash memory, a magnetic memory, and/or an optical memory).

Storage component 640 stores information and/or software related to the operation of device 600. For example, storage component 640 may include a hard disk drive, a magnetic disk drive, an optical disk drive, a solid state disk drive, a compact disc, a digital versatile disc, and/or another type of non-transitory computer-readable medium. Input component 650 enables device 600 to receive input, such as user input and/or sensed inputs. For example, input component 650 may include a touch screen, a keyboard, a keypad, a mouse, a button, a microphone, a switch, a sensor, a global positioning system component, an accelerometer, a gyroscope, an actuator, and/or the like. Output component 660 enables device 600 to provide output, such as via a display, a speaker, and/or one or more light-emitting diodes. Communication component 670 enables device 600 to communicate with other devices, such as via a wired connection and/or a wireless connection. For example, communication component 670 may include a receiver, a transmitter, a transceiver, a modem, a network interface card, an antenna, and/or the like.

Device 600 may perform one or more processes described herein. For example, a non-transitory computer-readable medium (e.g., memory 630 and/or storage component 640) may store a set of instructions (e.g., one or more instructions, code, software code, program code, and/or the like) for execution by processor 620. Processor 620 may execute the set of instructions to perform one or more processes described herein. In some implementations, execution of the set of instructions, by one or more processors 620, causes the one or more processors 620 and/or the device 600 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 6 are provided as an example. Device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
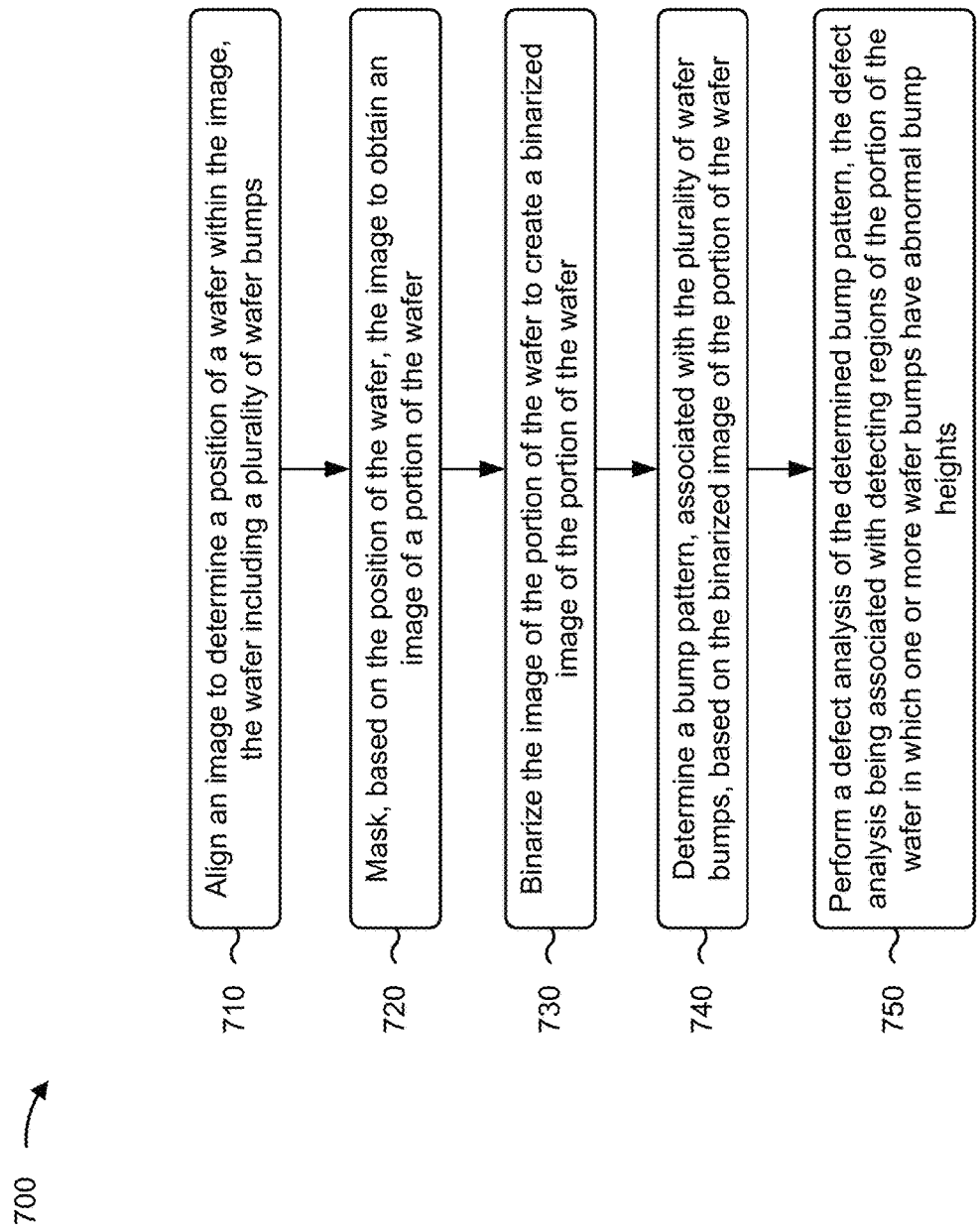
FIG. 7 is a flowchart of an example process relating to in-situ automated optical inspection of wafer bump heights in accordance with various aspects of the present disclosure.

FIG. 7 is a flowchart of an example process 700 associated with in-situ automated optical inspection of wafer bump heights. In some implementations, one or more process blocks of FIG. 7 may be performed by an image analysis device (e.g., image analysis device 208). Additionally, or alternatively, one or more process blocks of FIG. 7 may be performed by one or more components of device 600, such as processor 620, memory 630, storage component 640, input component 650, output component 660, and/or communication component 670.

As shown in FIG. 7, process 700 may include aligning an image to determine a position of a wafer within the image, the wafer including a plurality of wafer bumps (block 710). For example, the image analysis device 208 may align an image to determine a position of a wafer 300 within the image, the wafer 300 including a plurality of wafer bumps 304, as described above.

As further shown in FIG. 7, process 700 may include masking, based on the position of the wafer, the image to obtain an image of a portion of the wafer (block 720). For example, the image analysis device 208 may mask, based on the position of the wafer 300, the image to obtain an image of a portion of the wafer 300, as described above.

As further shown in FIG. 7, process 700 may include binarizing the image of the portion of the wafer to create a binarized image of the portion of the wafer (block 730). For example, the image analysis device 208 may binarize the image of the portion of the wafer 300 to create a binarized image of the portion of the wafer 300, as described above.

As further shown in FIG. 7, process 700 may include determining a bump pattern, associated with the plurality of wafer bumps, based on the binarized image of the portion of the wafer (block 740). For example, the image analysis device 208 may determine a bump pattern, associated with the plurality of wafer bumps 304, based on the binarized image of the portion of the wafer 300, as described above.

As further shown in FIG. 7, process 700 may include performing a defect analysis of the determined bump pattern, the defect analysis being associated with detecting regions of the portion of the wafer in which one or more wafer bumps have abnormal bump heights (block 750). For example, the image analysis device 208 may perform a defect analysis of the determined bump pattern, the defect analysis being associated with detecting regions of the portion of the wafer 300 in which one or more wafer bumps 304 have abnormal bump heights, as described above.

Process 700 may include additional implementations, such as any single implementation or any combination of implementations described below and/or in connection with one or more other processes described elsewhere herein.

In a first implementation, the bump pattern is a particular bump pattern that is determined by connecting points in the binarized image that are separated by a distance that is less than or equal to a threshold distance.

In a second implementation, alone or in combination with the first implementation, performing the defect analysis comprises identifying, based on the bump pattern and the image of the portion of the wafer 300, an open region, the open region being a region of the portion of the wafer 300 in which the bump pattern is not present, calculating an area of the open region, and determining whether the area of the open region satisfies an open area threshold.

In a third implementation, alone or in combination with one or more of the first and second implementations, the open area threshold is approximately 10% of an area of the wafer.

In a fourth implementation, alone or in combination with one or more of the first through third implementations, the bump pattern is a particular bump pattern that is determined by closing, filtering, and dilating points in the binarized image.

In a fifth implementation, alone or in combination with one or more of the first through fourth implementations, performing the defect analysis comprises identifying, based on the bump pattern, an open angular section, the open angular section being an angular section of the portion of the wafer 300 in which the bump pattern is not present, calculating an angle associated with the open angular section, and determining whether the angle associated with of the open angular section satisfies an open angle threshold.

In a sixth implementation, alone or in combination with one or more of the first through fifth implementations, the open angle threshold is in a range from approximately 10 degrees to approximately 20 degrees.

In a seventh implementation, alone or in combination with one or more of the first through sixth implementations, the defect analysis is performed following a plating process being performed on the wafer 300 and prior to a photoresist stripping process being performed on the wafer 300.

In an eighth implementation, alone or in combination with one or more of the first through seventh implementations, one or more wafer bumps 304 of the plurality of wafer bumps are 304 to form one or more through-package vias (TPVs) of the wafer 300.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

In this way, the optical inspection system 108 improves detection of TPVs having abnormal bump heights by enabling bump heights across an entire wafer to be evaluated immediately after plating. By enabling detection of abnormal bump heights immediately after plating, a glass recycle rate is improved. Further, by improving a sampling rate of evaluated bump heights, TPVs having abnormal bump heights are more likely to be detected. As a result, yield associated with manufacture of a device including TPVs is increased.

As described in greater detail above, some implementations described herein provide a method, an optical inspection system, and a plating tool.

In some implementations, the method includes aligning, by an image analysis device, an image to determine a position of a wafer within the image, the wafer including a plurality of wafer bumps. In some implementations, the method includes masking, by the image analysis device and based on the position of the wafer, the image to obtain an image of a portion of the wafer. In some implementations, the method includes binarizing, by the image analysis device, the image of the portion of the wafer to create a binarized image of the portion of the wafer. In some implementations, the method includes determining, by the image analysis device, a bump pattern, associated with the plurality of wafer bumps, based on the binarized image of the portion of the wafer. In some implementations, the method includes performing, by the image analysis device, a defect analysis of the determined bump pattern, the defect analysis being associated with detecting regions of the portion of the wafer in which one or more wafer bumps have abnormal bump heights.

In some implementations, an optical inspection system includes a light source to emit light to illuminate a wafer on a transfer path of a plating tool. In some implementations, the optical inspection system includes a camera to generate an image of the wafer on the transfer path. In some implementations, the optical inspection system includes a photoelectric sensor to detect the wafer on the transfer path, and trigger operation of the light source and operation of the camera based on the detection of the wafer on the transfer path, where the wafer is illuminated by the light source in the image generated by the camera. In some implementations, the optical inspection system includes an image analysis device to perform a defect analysis for wafer bumps of the wafer based on the image generated by the camera.

In some implementations, a plating tool includes an optical inspection system to obtain an image of a wafer including a group of wafer bumps formed by the plating tool, the image of the wafer being obtained while the wafer is on a transfer path of the plating tool, wherein the transfer path is a path between a processing chamber of the plating tool and a load chamber of the plating tool. In some implementations, the plating tool is further to perform, based on the image of the wafer, a defect analysis associated with detecting regions of the wafer in which one or more wafer bumps have abnormal bump heights, wherein the defect analysis is to be performed after a plating process performed by the plating tool and prior to a photoresist stripping process being performed on the wafer.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   binarizing, by an image analysis device, an image of a portion of a wafer to create a binarized image of the portion of the wafer;
   determining, by the image analysis device, a bump pattern based on the binarized image; and
   performing, by the image analysis device, a defect analysis of the determined bump pattern,
   the defect analysis being associated with detecting a region of the portion of the wafer in which one or more wafer bumps satisfies a threshold height, and
   wherein performing the defect analysis comprises:
      identifying, based on the bump pattern, an open angular section,
         the open angular section being an angular section of the portion of the wafer in which the bump pattern is not present,
      calculating an angle associated with the open angular section, and
      determining whether the angle associated with the open angular section satisfies an open angle threshold.

2. The method of claim 1, wherein detecting the region in which the one or more wafer bumps satisfies the threshold height comprises:
   detecting the region in which the one or more wafer bumps extend above a surface of a photoresist layer by a threshold amount.

3. The method of claim 1, wherein detecting the region in which the one or more wafer bumps satisfies the threshold height comprises:
   detecting the region in which the one or more wafer bumps do not extend to the threshold height.

4. The method of claim 1, wherein performing the defect analysis comprises:
   identifying another region of the portion of the wafer in which the bump pattern is not present;
   determining whether an area of the other region satisfies an open area threshold; and
   identifying, based on determining that the area of the other region satisfies the open area threshold, the other region as having abnormal bump heights.

5. The method of claim 4, wherein the open area threshold is a percentage of an area of the wafer.

6. The method of claim 1, wherein the bump pattern is determined by closing, filtering, and dilating points in the binarized image.

7. The method of claim 1, further comprising:
   identifying the open angular section as having abnormal bump heights based on the angle satisfying the open angle threshold.

8. The method of claim 7, further comprising:
   transmitting a signal, indicating a detection of a plating issue, based on identifying the open angular section as having abnormal bump heights.

9. The method of claim 1, wherein the defect analysis is performed prior to a photoresist stripping process being performed on the wafer.

10. An optical inspection system, comprising:
    a camera configured to generate an image of a wafer; and
    an image analysis device configured to:
       binarize the image based on a value associated with a brightness or intensity of illumination of each wafer bump of one or more wafer bumps of the wafer, and
       perform a defect analysis for the one or more wafer bumps based on binarizing the image,
       wherein, to perform the defect analysis, the image analysis device is configured to:
          identify, based on the one or more wafer bumps, an open angular section,
             the open angular section being an angular section of a portion of the wafer in which the one or more wafer bumps are not present,
          calculate an angle associated with the open angular section, and
          determine whether the angle associated with the open angular section satisfies an open angle threshold.

11. The optical inspection system of claim 10, further comprising one or more of:
    a light source, or
    a photoelectric sensor.

12. The optical inspection system of claim 10, wherein the image analysis device is further configured to:
    identify a region of the portion of the wafer in which a bump pattern is not present;
    determine whether an area of the region satisfies an open area threshold; and
    identify, based on the area of the region satisfying the open area threshold, the region as having abnormal bump heights.

13. The optical inspection system of claim 10, wherein the image analysis device is further configured to:
    identify the open angular section as having abnormal bump heights based on the angle satisfying the open angle threshold.

14. The optical inspection system of claim 13, wherein the image analysis device is further configured to:
    transmit a signal, indicating a detection of a plating issue, based on the open angular section being identified as having abnormal bump heights.

15. The optical inspection system of claim 10, wherein the image analysis device is configured to perform the defect analysis prior to a photoresist stripping process to be performed on the wafer.

16. A plating tool, comprising:
    an optical inspection system configured to:
       obtain an image of a wafer including a group of wafer bumps;
       binarize the image of the wafer based on a value associated with a brightness or intensity of illumination of each wafer bump of the group of wafer bumps; and perform, based on binarizing the image of the wafer, a defect analysis associated with detecting a region of the wafer in which one or more wafer bumps satisfies a threshold height, the defect analysis to be performed prior to a photoresist stripping process being performed on the wafer, and wherein, to perform the defect analysis, the optical inspection system is configured to:

identify, based on the group of wafer bumps, an open angular section, the open angular section being an angular section of a portion of the wafer in which the group of wafer bumps is not present, calculate an angle associated with the open angular section, and determine whether the angle associated with the open angular section satisfies an open angle threshold.

17. The plating tool of claim 16, wherein the optical inspection system further comprises one or more of a photoelectric sensor, a light source, a camera, or an image analysis device.

18. The plating tool of claim 16, wherein the optical inspection system, to detect the region in which the one or more wafer bumps satisfies the threshold height, is configured to:

detect the region in which the one or more wafer bumps extend above a surface of a photoresist layer by a threshold amount.

19. The plating tool of claim 16, wherein the optical inspection system, to detect the region in which the one or more wafer bumps satisfies the threshold height, is configured to:

detect the region in which the one or more wafer bumps do not extend to the threshold height.

20. The plating tool of claim 16, wherein at least one wafer bump, of the group of wafer bumps, forms a through-package via (TPV) of the wafer.

* * * * *